Dec. 23, 1941.	W. C. RAST	2,267,169
APPARATUS FOR TREATING FEET
Filed July 15, 1940    2 Sheets-Sheet 2
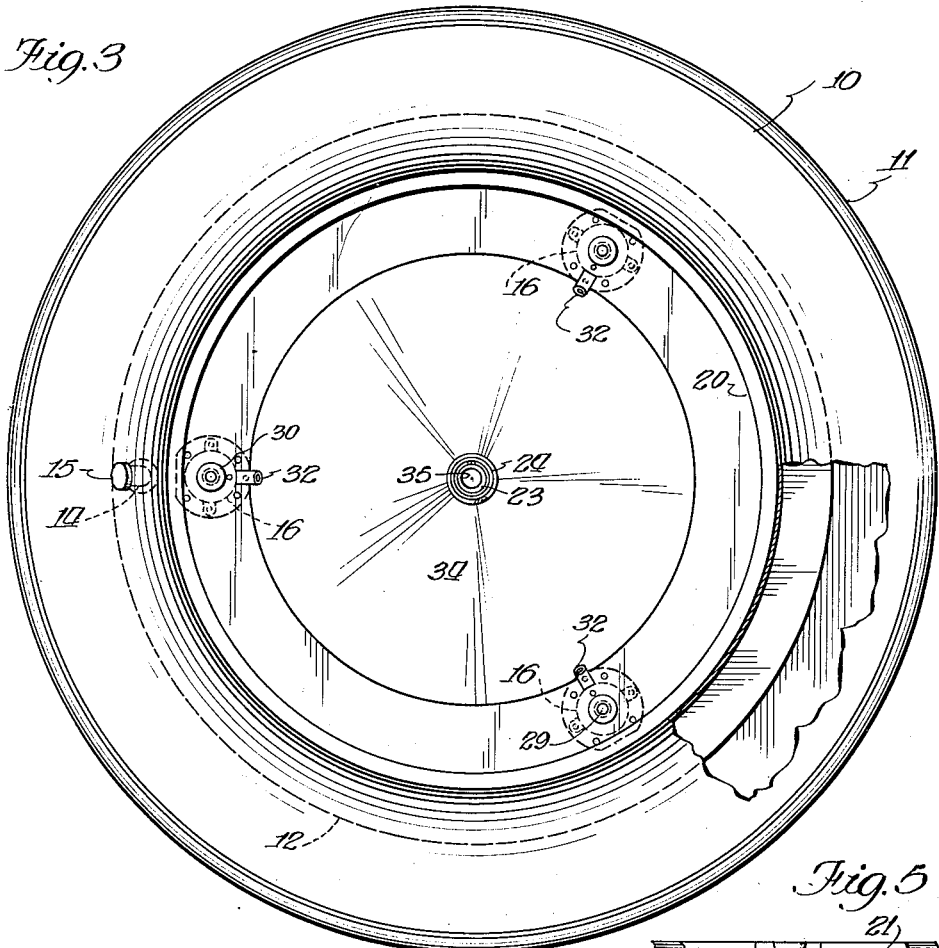

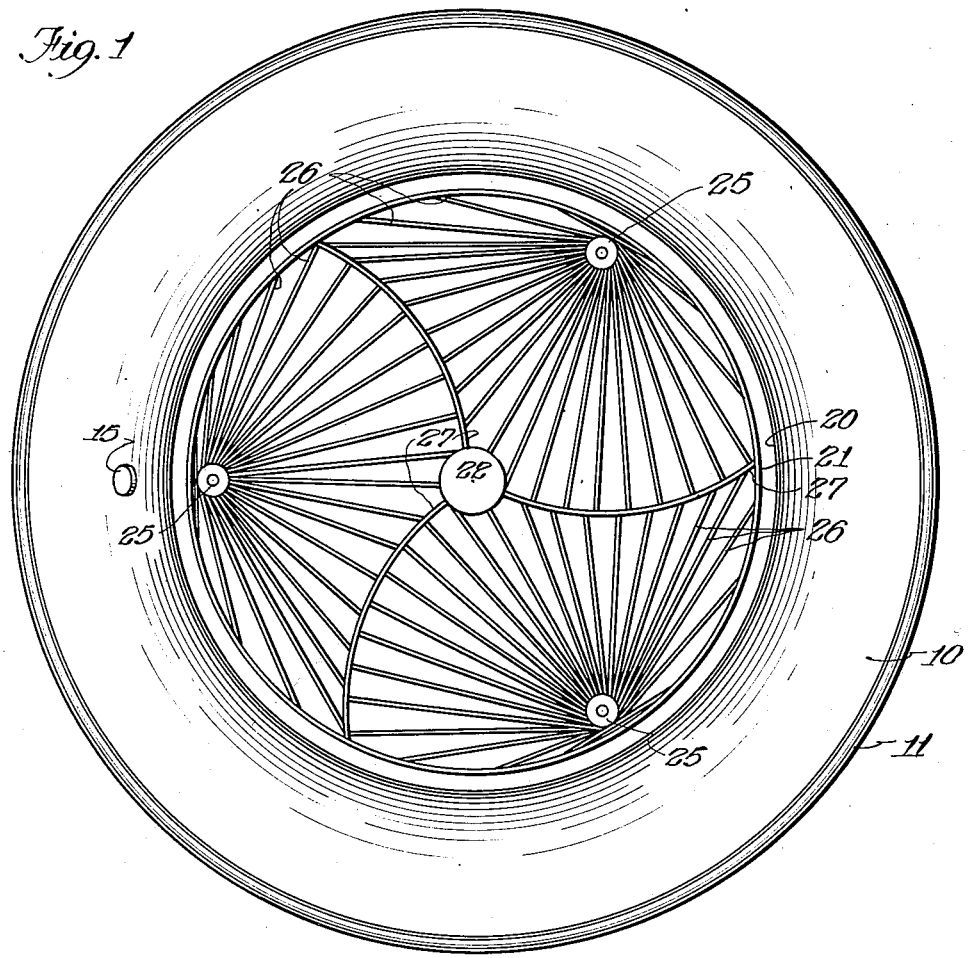
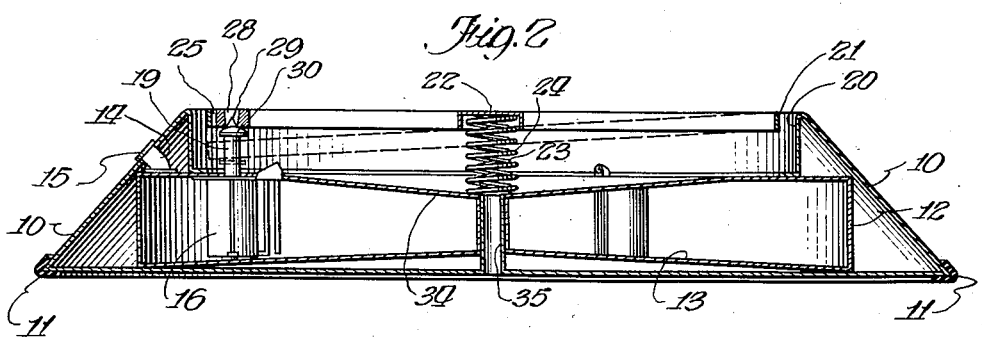

Patented Dec. 23, 1941

2,267,169

UNITED STATES PATENT OFFICE 2,267,169

APPARATUS FOR TREATING FEET

William C. Rast, Seattle, Wash.

Application July 15, 1940, Serial No. 345,517

14 Claims. (Cl. 4—182)

The invention relates to improvements in apparatus for treating feet and the like, the primary object of the invention being the provision of an improved apparatus of the character indicated which is of simple construction and highly efficient in use.

Another object of the invention is the provision of an improved apparatus of the character indicated especially adapted for the treatment of the feet to prevent the spread of disease or infections and which is of simple construction and highly efficient in use.

Other objects will appear hereinafter.

The invention consists of the combinations and arrangements of parts hereinafter described and claimed.

The invention will be best understood by reference to the accompanying drawings forming a part of this specification, and in which Fig. 1 is a top plan view of apparatus embodying the invention;

Fig. 2 a transverse vertical section of the same;

Fig. 3 a top plan view of the same with portions removed and others broken away for the sake of clearness;

Fig. 4 an enlarged detail section through one of a plurality of spraying members employed in the construction; and Fig. 5 a section taken substantially on line 5—5 of Fig. 4.

The embodiment of the invention illustrated in the drawings comprises a suitable base 10 which is preferably made of sheet metal in the form of a truncated cone having a rubber cushion or buffer 11 arranged around the outer edges thereof. A tank 12 is arranged as shown within the base 10 and is provided with an outwardly sloping bottom 13 as indicated. A filling spout 14 is connected with the top of the tank 12 and extended through the adjacent wall of the base 10 where it is provided with a removable cap 15. By this arrangement provision is made whereby the tank may be readily filled with a suitable prophylactic medicinal solution or the like for treatment of the feet to prevent the spread of parasitic infectious diseases or the like. Such a solution is lighter than water so that the outwardly sloping bottom 13 of the tank 12 will cause any water of condensation depositing in said tank to collect automatically in the outer lower portions of said tank, as indicated in Fig. 4, and so that said water of condensation may be readily withdrawn through the spout 14 by means of a syringe, suction pump or siphon, as will be readily understood.

Three spray pump cylinders 16 are arranged as indicated, equally spaced around the periphery of the tank 12. Each of the cylinders 16 is provided with a vertically reciprocating pump piston 17 normally held elevated by a compression spring 18 and connected with a piston rod 19 slidably projecting through the top of the cylinder and tank 12, as indicated.

The base 10 is provided with a central circualr depression 20 in which is mounted a circular platform 21. The platform 21 is provided with a centrally flanged bearing plate 22 resting upon an inner coiled spring 23 having a larger and stronger outer coiled spring 24 surrounding the same and whereby said platform is mounted for rocking yielding depression in every direction, as indicated by the dotted lines in Fig. 2. Supplemental supporting plates or blocks 25 are arranged as indicated in the platform 21 directly over each piston rod 19, said supporting blocks 25 being in turn supported by slats 26 radiating therefrom as shown, the inwardly extending slats 26 being secured to and supported by arcuate bars 27 extending from the periphery of the platform to the central bearing member 22, as shown.

Each of the bearing blocks 25 is provided with a central opening 28 fitting loosely over a conical point 29 on the top of a rocking washer 30 secured to the top of the corresponding piston rod 19 and whereby a connection is effected between the platform 21 and each of the pump pistons 17 so that peripheral depression of the corresponding portion of the platform 21 will cause corresponding depression of the corresponding piston 17, as will be readily understood.

An air pipe 31 leads from the bottom of each of the pump cylinders 17 to a spray head 32 located at the inner top side of each cylinder and having a spray tube 33 extending therefrom to a position adjacent the bottom of the tank 13 above the level of the outer portion thereof so that said spray pipe 33 will in no event withdraw any of the water of condensation from the outer lower portions of the tank, as will be readily apparent from Fig. 4 of the drawings. As shown, the top 34 of the tank 12 slopes inwardly toward the center thereof where a drain pipe 35 is arranged to extend downwardly through the tank 12 and the bottom of the base 10 so as to permit of the ready drainage and discharge of all liquid falling on the top of the tank from the platform 21.

In use and in operation, the apparatus is placed in a doorway through which persons must pass from and to showers, lockers and the like in athletic or sporting buildings. A person walking over the device in bare feet depresses the periphery of the platform 21 nearest to the point of contact of the feet, thereby causing an atomized spray of the prophylactic solution to be ejected upwardly and toward the center of the platform through the radially arranged slats and against the sole of the foot on the platform. Shifting of the weight brings into similar action the spray members not depressed by such initial movement. By standing on the device with both feet and swinging the body in a wobbly movement, the three spraying members will be operated consecutively and produce a continuous spraying action. In this way the feet of the user will be subjected to a fresh, clean, full strength spray of medicinal preparation unaffected by the amount of use and uncontaminated by previous contact with diseased or infected feet. Being completely enclosed, the apparatus can be easily cleaned of any litter or refuse dropped on it and the supply of medicinal preparation cannot become diluted from drainage from the feet or polluted with dirt, lint, cigarette butts, matches or other debris. If inflammable or explosive medicinal preparations are used, they quickly evaporate or drain away and the main supply is of course entirely enclosed so as to reduce the fire hazard. The specific form and arrangement of parts disclosed is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. Apparatus of the class described comprising a supporting platform mounted to be capable of rocking motion in any direction; and a plurality of spraying members operatively connected with outer portions of said platform and adapted and arranged to project sprays thereover.

2. The apparatus specified in claim 1 in which the platform is provided with a central support and the spraying members yieldingly support the outer portions thereof.

3. The apparatus specified in claim 1 in which the platform is provided with a central spring support and the spraying members yieldingly support the outer portions thereof.

4. The apparatus specified in claim 1 in which the platform is provided with supporting slats radiating inwardly from each spraying member.

5. The apparatus specified in claim 1 in which the platform is circular in shape and is arranged in a correspondingly shaped well.

6. The apparatus specified in claim 1 in which the platform is circular in shape, arranged in a correspondingly shaped well and is provided with a central spring support and the spraying members yieldingly support the outer portions thereof, said platform being also provided with supporting slats radiating inwardly from each spraying member.

7. Apparatus of the class described comprising a base having a central well; a supporting platform yieldingly mounted in said well to be capable of peripheral depressions therein; and a plurality of spraying means operatively connected with said platform to be operated by peripheral depressions thereof.

8. The apparatus specified in claim 7 in which the platform is provided with a central support and the spraying means yieldingly support the outer portions thereof.

9. The apparatus specified in claim 7 in which the platform is provided with a central support and the spraying means yieldingly support the outer portions thereof.

10. The apparatus specified in claim 7 in which the central well and platform are circular in shape, the platform is provided with a central spring support and the spring means yieldingly support the outer portions thereof and the platform is provided with supporting slats radiating inwardly from each spraying means.

11. Apparatus of the class described comprising a supply tank containing liquid; spraying means connected with the liquid in said tank at a comparatively high level thereof; and means for operating said spraying means.

12. The apparatus specified in claim 11 in which the tank has a sloping bottom and the spraying means is connected adjacent a higher level of said bottom.

13. The apparatus specified in claim 11 in which the tank is circular in form, its bottom slopes towards its periphery and the spraying means is connected adjacent a higher level of said bottom.

14. The apparatus specified in claim 11 in which the tank is circular in form, its bottom slopes toward its periphery and the spraying means is connected adjacent a higher level of said bottom, and the spray operating means consists of a centrally supported rocking platform located on top of said tank.

WILLIAM C. RAST.